United States Patent
Jiang et al.

(10) Patent No.: US 12,430,772 B2
(45) Date of Patent: Sep. 30, 2025

(54) TARGET TRACKING METHOD, COMPUTER-READABLE STORAGE MEDIUM, AND COMPUTER DEVICE

(71) Applicant: ARASHI VISION INC., Shenzhen (CN)

(72) Inventors: Wenjie Jiang, Shenzhen (CN); Rui Xu, Shenzhen (CN)

(*) Notice: Subject to any disclaimer, the term of this patent is extended or adjusted under 35 U.S.C. 154(b) by 311 days.

(21) Appl. No.: 18/267,809

(22) PCT Filed: Dec. 16, 2021

(86) PCT No.: PCT/CN2021/138913
§ 371 (c)(1),
(2) Date: Jun. 16, 2023

(87) PCT Pub. No.: WO2022/127876
PCT Pub. Date: Jun. 23, 2022

(65) Prior Publication Data
US 2024/0037758 A1  Feb. 1, 2024

(30) Foreign Application Priority Data
Dec. 16, 2020 (CN) .......................... 202011488167.9

(51) Int. Cl.
*G06K 9/00* (2022.01)
*G06T 3/40* (2006.01)
(Continued)

(52) U.S. Cl.
CPC ................. *G06T 7/20* (2013.01); *G06T 3/40* (2013.01); *G06V 10/25* (2022.01); *G06V 10/761* (2022.01)

(58) Field of Classification Search
None
See application file for complete search history.

(56) References Cited

U.S. PATENT DOCUMENTS

| 9,483,839 B1 | 11/2016 | Kwon et al. |
| 2017/0345179 A1* | 11/2017 | Gao ........................ G06T 7/277 |
| 2020/0117946 A1 | 4/2020 | Che |

FOREIGN PATENT DOCUMENTS

| CN | 105512618 A | 4/2016 |
| CN | 108470332 A | 8/2018 |

(Continued)

*Primary Examiner* — S J Park
(74) *Attorney, Agent, or Firm* — BAYES PLLC

(57) ABSTRACT

A target tracking method, a computer-readable storage medium, and a computer device. The method comprises: matching a target tracking box with target candidate boxes to determine a target candidate box in best matching with the target tracking box; matching one or more remaining target candidate boxes, except for the best matching target candidate box, with a second target candidate box detected previously to determine a corresponding matching relationship; according to the best matching target candidate box and the corresponding matching relationship, obtaining distances and overlapping relationships respectively between the best matching target candidate box and the one or more remaining target candidate boxes and between the best matching target candidate box and the second target candidate box, so as to determine a shielding relationship between a target and other objects in the current video frame; and determining, according to the shielding relationship, whether to restart target tracking.

20 Claims, 7 Drawing Sheets

(51) Int. Cl.
*G06T 7/20* (2017.01)
*G06V 10/25* (2022.01)
*G06V 10/74* (2022.01)

(56) References Cited

FOREIGN PATENT DOCUMENTS

| | | |
|---|---|---|
| CN | 110136171 A | 8/2019 |
| CN | 110189365 A | 8/2019 |
| CN | 111126152 A | 5/2020 |
| CN | 111242977 A | 6/2020 |
| CN | 111429483 A | 7/2020 |
| CN | 111652909 A | 9/2020 |
| CN | 111709975 A | 9/2020 |
| CN | 112489090 A | 3/2021 |

* cited by examiner

TARGET TRACKING METHOD, COMPUTER-READABLE STORAGE MEDIUM, AND COMPUTER DEVICE

TECHNICAL FIELD OF THE INVENTION

The present application relates to the field of video processing, and in particular, relates to a target tracking method, a computer-readable storage medium, and a computer device.

BACKGROUND OF THE INVENTION

The problem of shielding is a very serious problem in target tracking, and many existing target tracking algorithms propose some solutions for processing the problem of shielding. For example, a Tracking-Learning-Detection (TLD) algorithm is proposed as an architecture for long-term tracking of an unknown object in a video, and the TLD algorithm consists of three parts: a tracker, a detector, and a learner. The tracker is configured to observe a moving direction of a target between video frames; the detector considers each of the video frames as independent and then performs positioning; and the learner evaluates the error of the detector according to the result of the tracker, generates a training sample to update the target model of the detector, and avoids similar errors in the future.

However, the target tracking algorithm in the prior art cannot accurately track a target in the case where the target is shielded by other objects (such as people, animals, vehicles, etc.) when the target tracking algorithm is applied in single target tracking.

SUMMARY OF THE INVENTION

Embodiments of the present application provide a target tracking method and device, a computer-readable storage medium, a computer device, and a camera, which aim to solve one of the above-mentioned problems.

According to a first aspect, an embodiment of the present application provides a target tracking method, and the method includes:

S101: obtaining a target tracking box tracked in a current video frame and target candidate boxes detected in the current video frame;

S102: matching the target tracking box with the target candidate boxes to determine a best matching target candidate box;

S103: matching one or more remaining target candidate boxes, except for the best matching target candidate box, in the target candidate boxes with a plurality of second target candidate boxes detected in a previously detected video frame to determine a corresponding matching relationship;

S104: according to the best matching target candidate box and the corresponding matching relationship, obtaining distances and overlapping relationships respectively between the best matching target candidate box and the one or more remaining target candidate boxes and between the best matching target candidate box and the second target candidate box, so as to determine a shielding relationship between a target and other objects in the current video frame;

S105: determining, according to the shielding relationship between the target and the other objects, whether to restart target tracking.

According to a second aspect, the present application provides a target tracking device, and the device includes:

an obtaining module, being configured to obtain a target tracking box tracked in a current video frame and target candidate boxes detected in the current video frame;

a target candidate box determining module, being configured to match the target tracking box with the target candidate boxes to determine a target candidate box in best matching with the target tracking box;

a matching relationship determining module, being configured to match one or more remaining target candidate boxes, except for the best matching target candidate box, in the target candidate boxes with a plurality of second target candidate boxes detected in a previously detected video frame to determine a corresponding matching relationship;

a shielding relationship determining module, being configured to: according to the best matching target candidate box and the corresponding matching relationship, obtain distances and overlapping relationships respectively between the best matching target candidate box and the one or more remaining target candidate boxes and between the best matching target candidate box and the second target candidate box, so as to determine a shielding relationship between a target and other objects in the current video frame;

a determining module, being configured to determine, according to the shielding relationship between the target and the other objects, whether to restart target tracking.

According to a third aspect, the present application provides a computer-readable storage medium storing a computer program, and the computer program, when executed by a processor, implements the steps of the target tracking method as described above.

According to a fourth aspect, the present application provides a computer device, which includes:

one or more processors;
a memory; and
one or more computer programs, the processor and the memory being connected via a bus, wherein the one or more computer programs are stored in the memory and configured to be executed by the one or more processors, and the processor implements the steps of the target tracking method as described above when it executes the computer program.

According to a fifth aspect, the present application provides a camera, which includes:

one or more processors;
a memory; and
one or more computer programs, the processor and the memory being connected via a bus, wherein the one or more computer programs are stored in the memory and configured to be executed by the one or more processors, and the processor implements the steps of the target tracking method as described above when it executes the computer program.

In the embodiments of the present application, one or more remaining target candidate boxes, except for the best matching target candidate box, in the target candidate boxes are matched with a plurality of second target candidate boxes detected in a previously detected video frame to determine a corresponding matching relationship; according to the best matching target candidate box and the corresponding matching relationship, distances and overlapping relationships respectively between the best matching target candidate box and the one or more remaining target candidate boxes and between the best matching target candidate box and the second target candidate box are obtained, so as to determine a shielding relationship between a target and other objects in the current video frame; and whether to restart target tracking is determined according to the shielding relationship between the target and other objects. Thus, the robustness of long-time tracking for a single target can be improved, a wrong result due to interference to the tracking target from other objects is avoided, and if the target is shielded by other objects, tracking is restarted and tracking of the tracking target is recovered; therefore, the tracking target can be ensured to be accurate to avoid false detection.

DETAILED DESCRIPTION OF THE INVENTION

In order to make the objectives, technical solutions, and beneficial effects of the present application clearer, the present application will be further described in detail below with reference to attached drawings and embodiments. It shall be appreciated that, the specific embodiments described herein are merely used to explain the present application, and are not intended to limit the present application.

In order to illustrate the technical solutions described in the present application, the following description is made with reference to specific embodiments.

Figure 1:
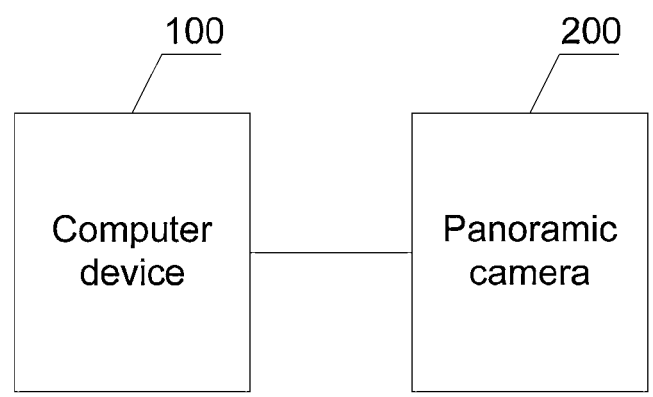
FIG. 1 is a schematic view of an application scenario for a target tracking method provided according to an embodiment of the present application.

The application scenario of a target tracking method provided according to an embodiment of the present application may be a computer device or a camera, and the computer device or the camera executes the target tracking method provided according to an embodiment of the present application to track a target in a video. The application scenario of the target tracking method provided according to an embodiment of the present application may also include a computer device 100 and a camera 200 (as shown in FIG. 1) connected to each other. The computer device 100 and the camera 200 may run at least one application. The computer device 100 may be a server, a desktop computer, a mobile terminal or the like, and the mobile terminal includes a mobile phone, a tablet computer, a notebook computer, a personal digital assistant, or the like. The camera 200 may be a common camera or a panoramic camera or the like. The common camera refers to a photographing device for photographing a planar image and a planar video. The computer device 100 or the camera 200 executes the target tracking method provided according to an embodiment of the present application to track a target in a video.

Figure 2:
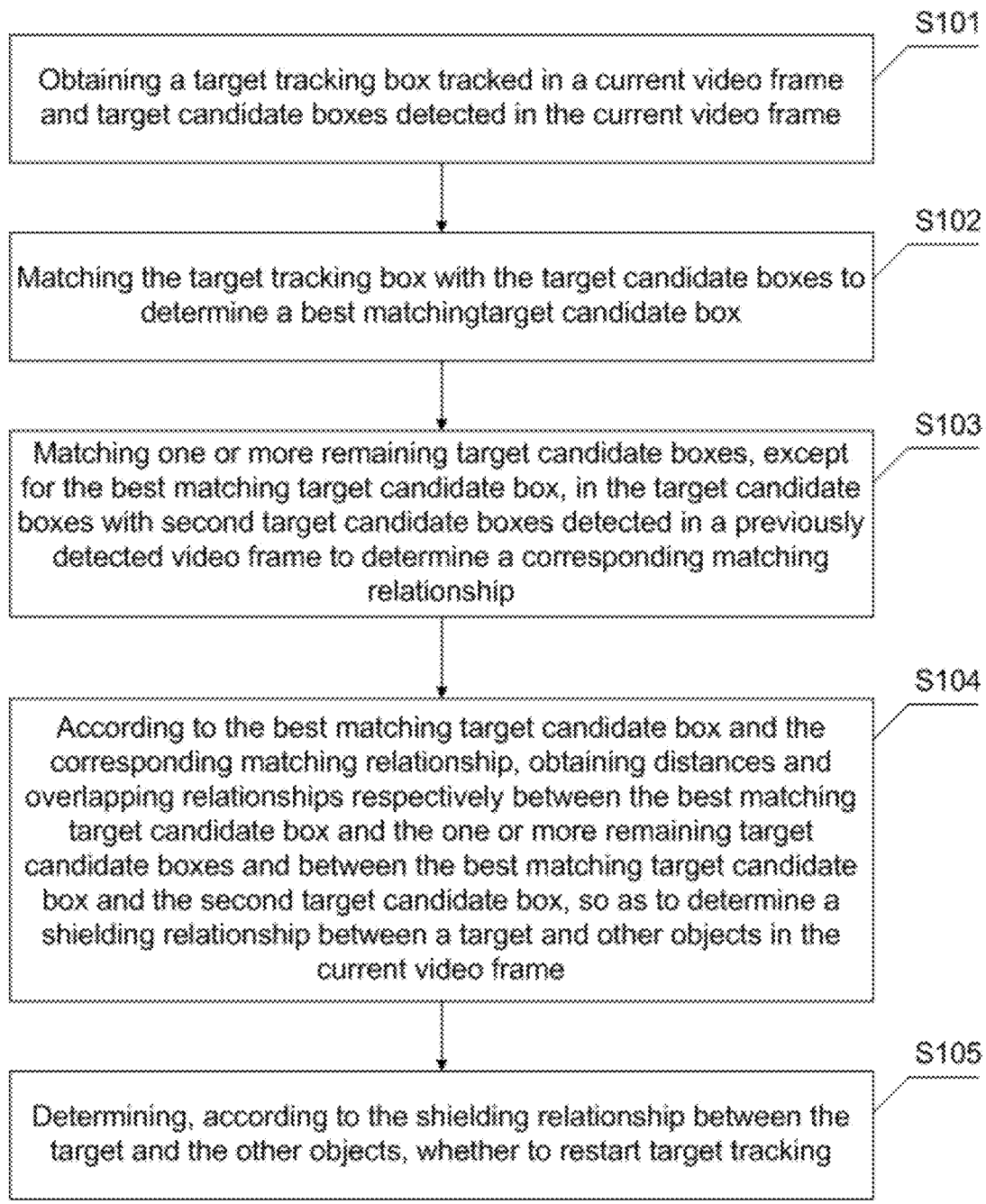
FIG. 2 is a flowchart diagram of a target tracking method provided according to an embodiment of the present application.

Referring to FIG. 2, which is a flowchart diagram of a target tracking method provided according to an embodiment of the present application, this embodiment mainly takes the case where the target tracking method is applied to a computer device or a camera as an example for illustration, and the target tracking method provided according to an embodiment of the present application includes the following steps.

S101: obtaining a target tracking box tracked in a current video frame and target candidate boxes detected in the current video frame.

Figure 3:
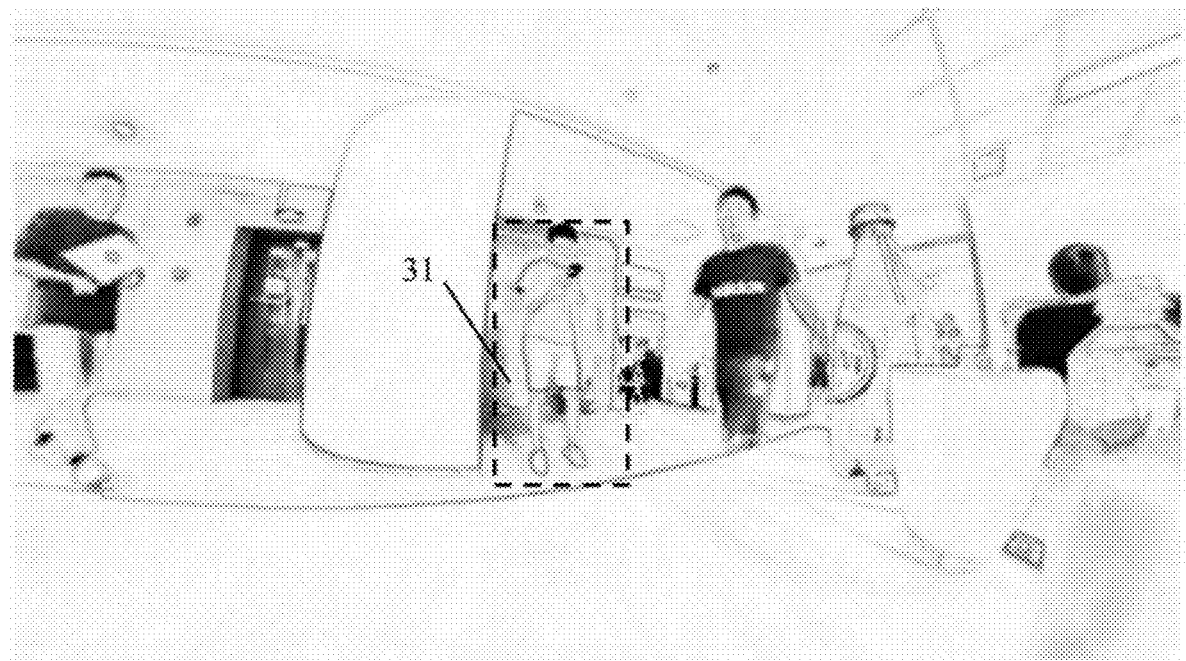
FIG. 3 is a schematic view of a target tracking box tracked in a current video frame.
Figure 4:
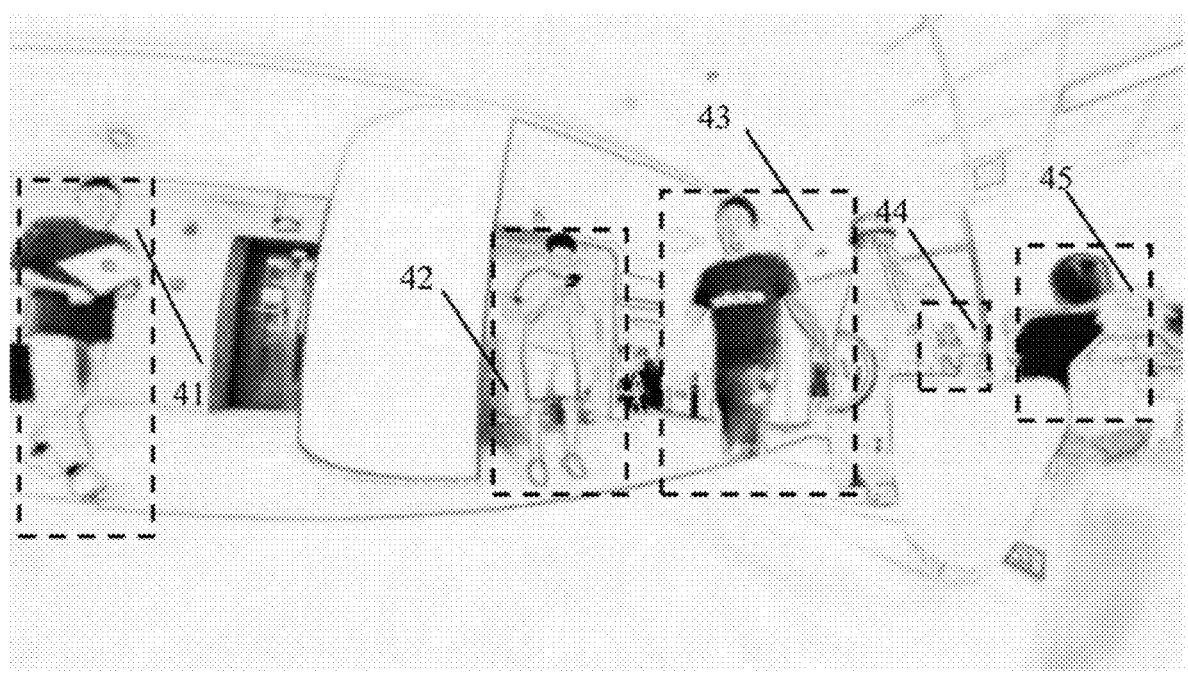
FIG. 4 is a schematic view of target candidate boxes detected in the current video frame.

The target tracking box is as shown in the rectangular box in FIG. 3; and the target candidate boxes are as shown in the rectangular boxes in FIG. 4.

In an embodiment of the present application, the target tracking box tracked in the current video frame may specifically be obtained by tracking a target in the video by using a tracker.

The target candidate boxes detected in the current video frame may specifically be target candidate boxes detected in the current video frame by using a detector.

In an embodiment of the present application, the target candidate boxes detected in the current video frame may specifically be:

target candidate boxes detected in the current video frame by performing detection at a predetermined frame interval. By performing detection at a predetermined frame interval, the processing time of the detection algorithm can be saved. Of course, in order to improve the accuracy of detection, detection may also be performed on each of the video frames, and this is not specifically limited in the present application.

In an embodiment of the present application, the video may be a panoramic video or a planar video or other forms of video, and this is not specifically limited in the present application.

As shown in FIG. 3, the target tracking box tracked in the current video frame is the target tracking box 31 in FIG. 3, the target candidate boxes detected in the current video frame are the five target candidate boxes 41, 42, 43, 44 and 45 in FIG. 4, and the number of the target candidate boxes may be multiple.

S102: matching the target tracking box with the target candidate boxes to determine a best matching target candidate box which is in best matching with the target tracking box.

In an embodiment of the present application, S102 may specifically include:

matching the target tracking box respectively with the target candidate boxes specifically by using Intersection over Union (IoU) to obtain an IoU value corresponding to each of the target candidate boxes; IoU is a standard for measuring the accuracy of detecting a corresponding object in a specific data set, IoU is a simple measurement standard, and any task in which a prediction range can be obtained in the output can be measured by IoU;

Specifically, a target candidate box with the maximum corresponding IoU value and satisfying a preset threshold may be taken as the target candidate box in best matching with the target tracking box.

S103: matching one or more remaining target candidate boxes (e.g., all or some of the remaining target candidate boxes), except for the best matching target candidate box, in the target candidate boxes with a plurality of second target candidate boxes detected in a previously detected video frame to determine a corresponding matching relationship.

In an embodiment of the present application, S103 may specifically include:

respectively matching one or more remaining target candidate boxes, except for the best matching target candidate box, in the target candidate boxes with a plurality of second target candidate boxes detected in a previously detected video frame specifically by using Intersection over Union (IoU), and determining corresponding matching relationships between the one or more remaining target candidate boxes and the second target candidate box by using the Munkres Assignment Algorithm.

For example, multiple remaining target candidate boxes in the current video frame (the t-th video frame) are: A1, A2, A3 and A4.

The second target candidate boxes detected in the previously detected video frame (e.g., the (t-1)th video frame or the (t-3)th video frame or the like which is specifically determined according to a predetermined frame interval for detection, and the previous video frame is the (t-1)th video frame if the predetermined frame interval is 1, and the previous video frame is the (t-3)th video frame if the predetermined frame interval is 3) are B1, B2, B3 and B4.

The corresponding matching relationships are A1 vs. B1, A2 vs. B2, A3 vs. B3, and A4 vs. B4. Since four targets simultaneously appear in the two video frames, the target candidate boxes of the two video frames are associated.

Figure 5:
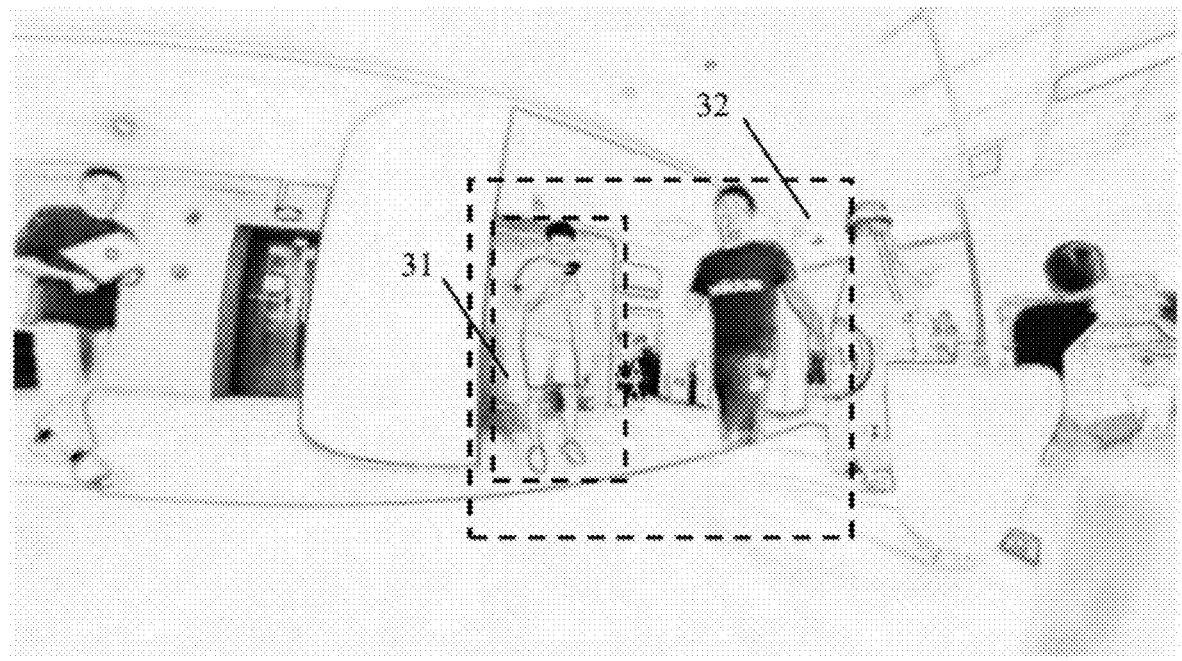
FIG. 5 is a schematic view of a region of interest.

In an embodiment of the present application, S103 may specifically include.

setting an area enlarged at a predetermined proportion (e.g., a block region 32 in FIG. 5) as a region of interest by taking the target tracking box as a center, respectively matching one or more remaining target candidate boxes, except for the best matching target candidate box, located in the region of interest among the target candidate boxes with a second target candidate box detected in a previously detected video frame specifically by using Intersection over Union (IoU), and determining corresponding matching relationships between the one or more remaining target candidate boxes and the second target candidate box by using the Munkres Assignment Algorithm. Since only the remaining target candidate boxes located in the region of interest are matched, the amount of computation of the algorithm can be reduced.

For example, multiple remaining target candidate boxes in the region of interest of the current video frame (the t-th video frame) are: A1, A2, A3 and A4.

The second target candidate boxes detected in the previously detected video frame (e.g., the (t-1)th video frame or the (t-3)th video frame or the like which is specifically determined according to a predetermined frame interval for detection, and the previous video frame is the (t-1)th video frame if the predetermined frame interval is 1, and the previous video frame is the (t-3)th video frame if the predetermined frame interval is 3) are B1, B2, B3 and B4.

The corresponding matching relationships are A1 vs. B1, A2 vs. B2, A3 vs. B3, and A4 vs. B4. Since four targets simultaneously appear in the two video frames, the target candidate boxes of the two video frames are associated.

S104: according to the best matching target candidate box and the corresponding matching relationship, obtaining distances and overlapping relationships respectively between the best matching target candidate box and the one or more remaining target candidate boxes and between the best matching target candidate box and the second target candidate box, so as to determine a shielding relationship between a target and other objects in the current video frame.

Figure 6:
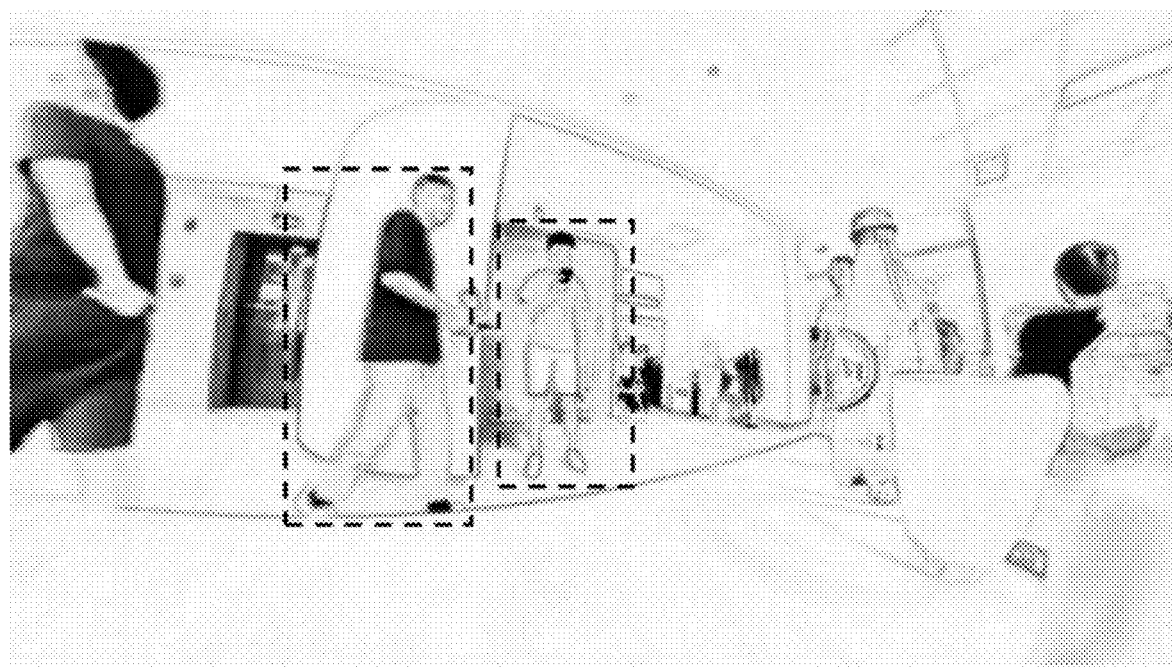
FIG. 6 is a schematic view of other objects gradually approaching a target.
Figure 7:
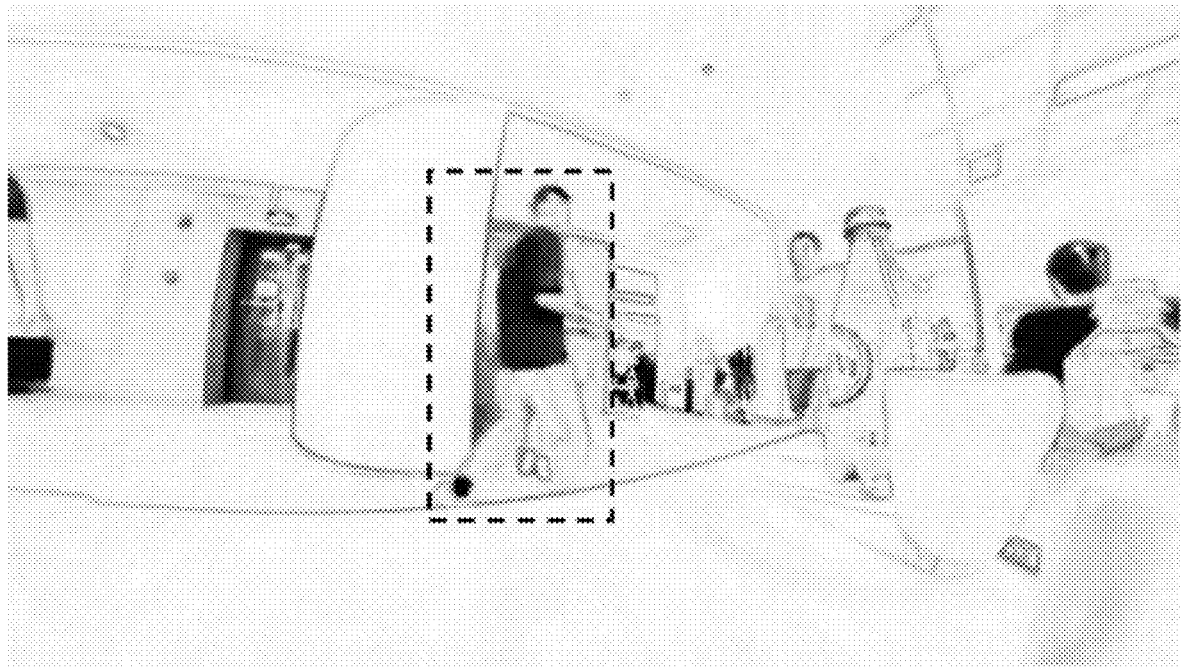
FIG. 7 is a schematic view of the target shielded by other objects.

The shielding relationship may include that the target is not shielded by other objects, other objects gradually move away from the target, other objects gradually approach the target, and the target is shielded by other objects. For example, FIG. 6 shows that other objects gradually approach the target, and FIG. 7 shows that the target is shielded by other objects. The state in which other objects gradually approach the target indicates that the target is very likely to be shield by other objects at the next detection moment.

In an embodiment of the present application, when the shielding relationship between the target and other objects in the current video frame is that other objects gradually approach the target or the target is shielded by other objects, then the method further includes the following step after the S104:

determining, according to the confidence of the target tracking, whether the target is shielded by other objects, e.g., determining that the target is shielded by other objects when the confidence of the target tracking is less than a preset threshold (e.g., 30%, 40% or the like).

S105: determining, according to the shielding relationship between the target and other objects, whether to restart target tracking.

In an embodiment of the present application, S105 may specifically include:

when the target is not shielded by other objects or other objects gradually move away from the target, continuing to track; and when the target is shielded by other objects, restarting the target tracking to recover tracking of the tracking target.

In an embodiment of the present application, the operation of restarting the target tracking to recover tracking of the tracking target may specifically be implemented by restarting the target tracking to recover tracking of the tracking target through using a Person Re-identification (ReID) network or an image similarity matching algorithm.

The Person Re-identification (ReID) network is a technique of using computer vision technology to determine whether there is a specific pedestrian in an image or a video sequence.

In another embodiment of the present application, the operation of restarting tracking and recovering tracking of the tracking target may specifically include the following steps:

detecting target candidate boxes in a next video frame following the current video frame, wherein the next video frame is a video frame detected next time by a detector;

determining candidate result boxes according to dimension and distance relationships between the target candidate boxes detected in the next video frame and the best matching target candidate box; specifically, there may be no more than n candidate result boxes, and n≥2, for example, n=5; (for example, the dimension of both the two target candidate boxes detected in the next video frame is 5*4 cm, the dimension of the best matching target candidate box is also 5*4 cm, the distance between one of the two target candidate boxes detected in the next video frame and the best matching target candidate box is 30 cm, and the distance between the other target candidate box and the best matching target candidate box is 20 cm, then both the two target candidate boxes can be used as the candidate result boxes).

The next video frame following the current video frame and the candidate result boxes are input into the ReID network for forward reasoning to obtain a tracking target again, and when the tracking target is obtained, then the tracking is restarted; and otherwise, the step of restarting the target tracking to recover tracking of the tracking target is continued until the maximum number of attempts is exceeded and the recovering fails.

Figure 8:
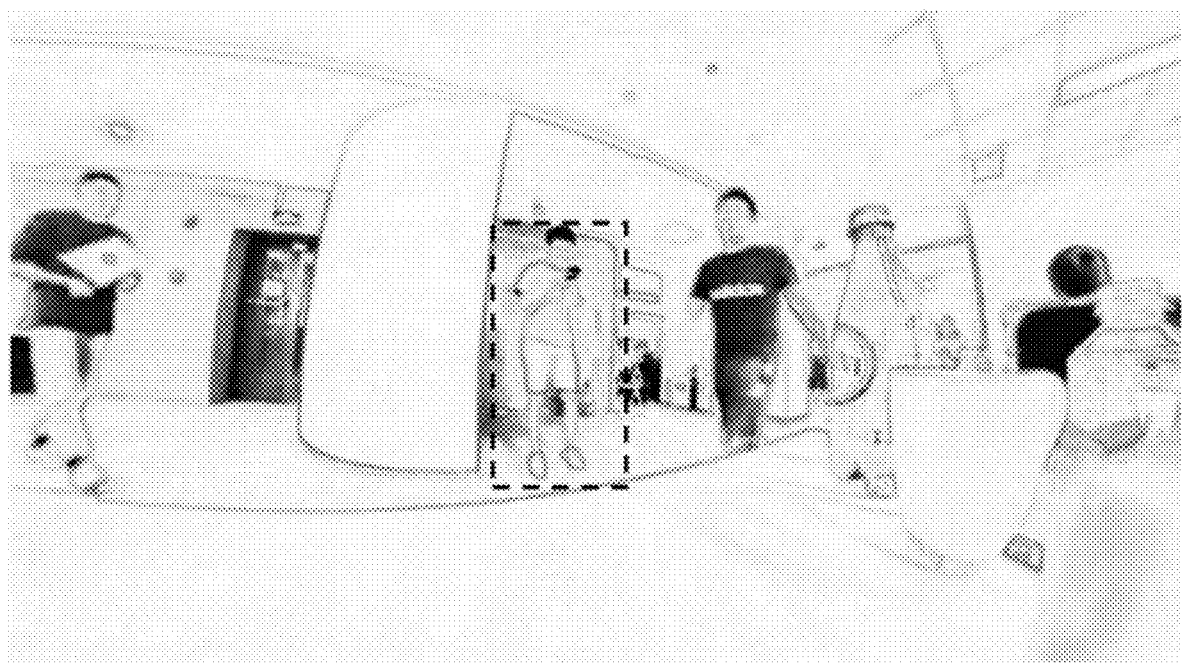
FIG. 8 is a schematic view of a target candidate box in best matching with the target tracking box.
Figure 9:
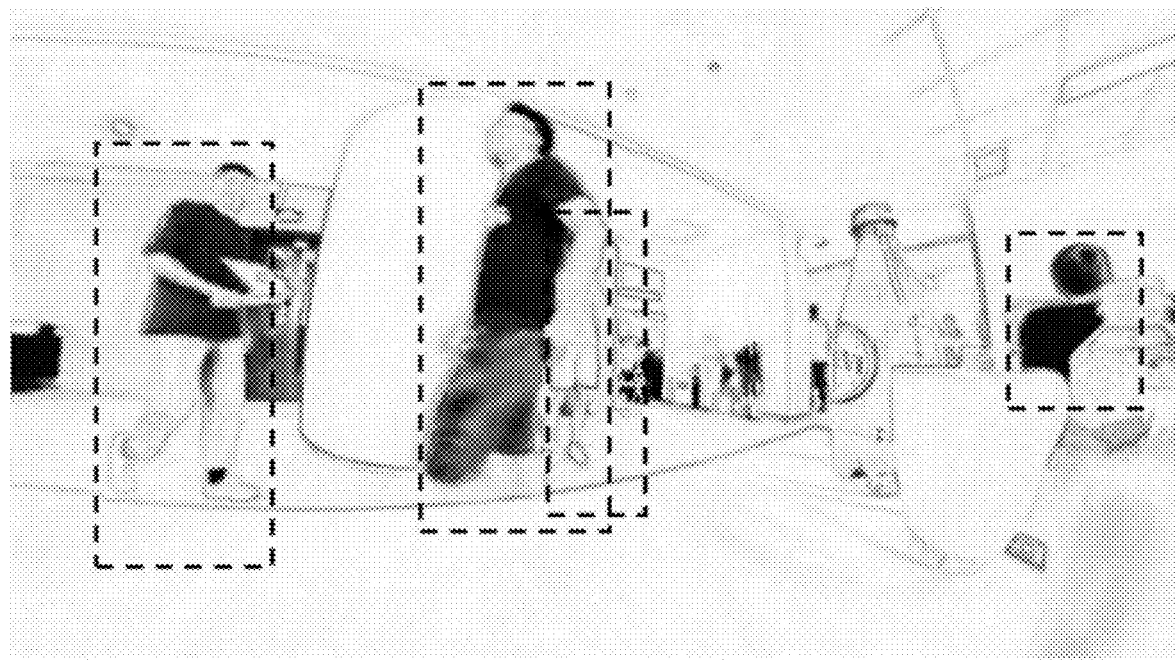
FIG. 9 is a schematic view of a next video frame following the current video frame.

In an embodiment of the present application, the forward reasoning is specifically as shown in FIG. 8 and FIG. 9, FIG. 8 shows a current video frame, wherein the rectangular box in FIG. 8 is the best matching target candidate box, FIG. 9 shows the next video frame following the current video frame, and the rectangular boxes in FIG. 9 are candidate result boxes; the forward reasoning specifically includes: inputting the next video frame following the current video frame and the candidate result boxes into the ReID network to obtain a similarity matrix with the best matching target candidate box; selecting a candidate result box of the minimum similarity distance from the candidate result boxes which are inputted, and determining whether the candidate result of the minimum similarity distance satisfies a threshold constraint, and if the candidate result of the minimum similarity distance satisfies the threshold constraint, considering that the tracking target is obtained, and using the candidate result box of the minimum similarity distance as a target tracking box to restart tracking, thereby completing the process of recovering the tracking of the tracking target.

In the embodiments of the present application, one or more remaining target candidate boxes, except for the best matching target candidate box, in the target candidate boxes are matched with a second target candidate box detected in a previously detected video frame to determine a corresponding matching relationship; according to the best matching target candidate box and the corresponding matching relationship, distances and overlapping relationships respectively between the best matching target candidate box and the one or more remaining target candidate boxes and between the best matching target candidate box and the second target candidate box are obtained, so as to determine a shielding relationship between a target and other objects in the current video frame; and whether to restart target tracking is determined according to the shielding relationship between the target and other objects. Thus, the robustness of long-time tracking for a single target can be improved, a wrong result due to interference to the tracking target from other objects is avoided, and if the target is shielded by other objects, tracking is restarted and tracking of the tracking target is recovered; therefore, the tracking target can be ensured to be accurate to avoid false detection.

Figure 10:
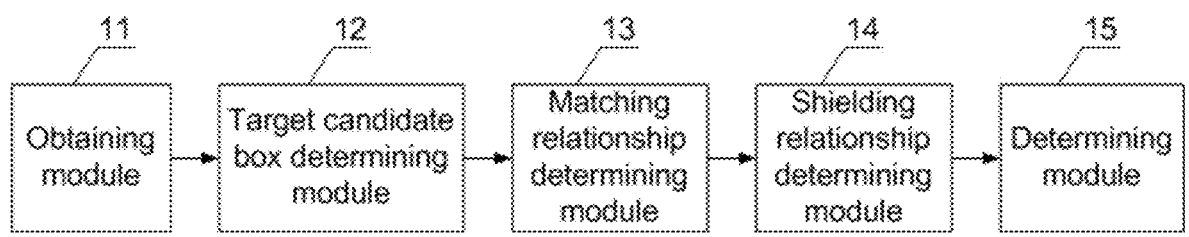
FIG. 10 is a schematic view of a target tracking device provided according to an embodiment of the present application.

Referring to FIG. 10, a target tracking device provided according to an embodiment of the present application may be a computer program or a program code running in a computer device or a camera, for example, the target tracking device is an application software; and the target tracking device may be configured to execute corresponding steps in the target tracking method provided according to the embodiment of the present application. The target tracking device provided according to an embodiment of the present application includes:

an obtaining module 11, being configured to obtain a target tracking box tracked in a current video frame and target candidate boxes detected in the current video frame;

a target candidate box determining module 12, being configured to match the target tracking box with the target candidate boxes to determine a target candidate box in best matching with the target tracking box;

a matching relationship determining module 13, being configured to match one or more remaining target candidate boxes, except for the best matching target candidate box, in the target candidate boxes with a second target candidate box detected in a previously detected video frame to determine a corresponding matching relationship;

a shielding relationship determining module 14, being configured to: according to the best matching target candidate box and the corresponding matching relationship, obtain distances and overlapping relationships respectively between the best matching target candidate box and the one or more remaining target candidate boxes and between the best matching target candidate box and the second target candidate box, so as to determine a shielding relationship between a target and other objects in the current video frame;

a determining module 15, being configured to determine, according to the shielding relationship between the target and other objects, whether to restart target tracking.

The target tracking device provided according to an embodiment of the present application belongs to the same concept as the target tracking method provided according to an embodiment of the present application, and the specific implementation process thereof is detailed throughout the specification, and thus will not be further described herein.

An embodiment of the present application further provides a computer-readable storage medium storing a computer program, and the computer program, when executed by a processor, implements the steps of the target tracking method provided according to an embodiment of the present application.

Figure 11:
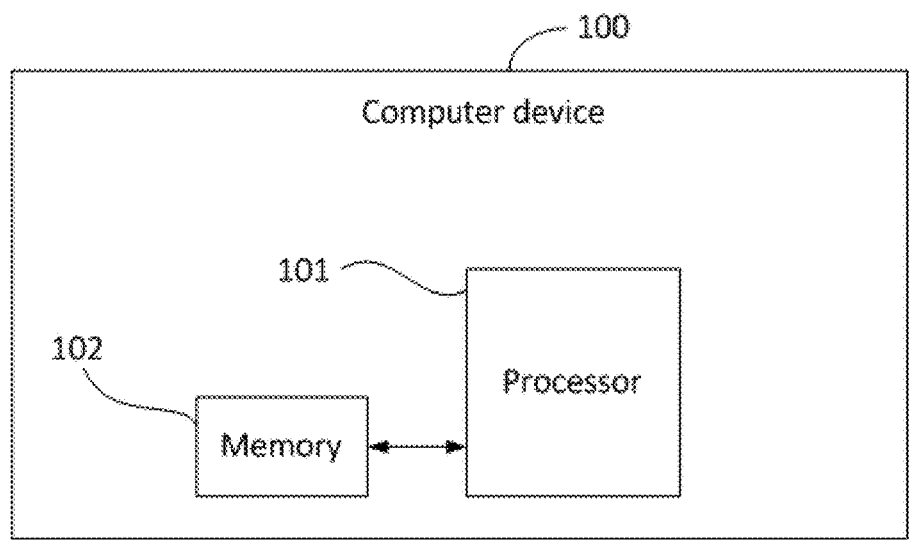
FIG. 11 is a block diagram illustrating the specific structure of a computer device provided according to an embodiment of the present application.

FIG. 11 is a block diagram illustrating the specific structure of a computer device provided according to an embodiment of the present application, the computer device may be the computer device shown in FIG. 1, and a computer device 100 includes: one or more processors 101, a memory 102, and one or more computer programs, wherein the processor 101 and the memory 102 are connected via a bus, the one or more computer programs are stored in the memory 102 and configured to be executed by the one or more processors 101, and the processor 101 implements the steps of the target tracking method provided according to an embodiment of the present application when it executes the computer program.

The computer device may be a desktop computer, a mobile terminal or the like, and the mobile terminal includes a mobile phone, a tablet computer, a notebook computer, a personal digital assistant or the like.

Figure 12:
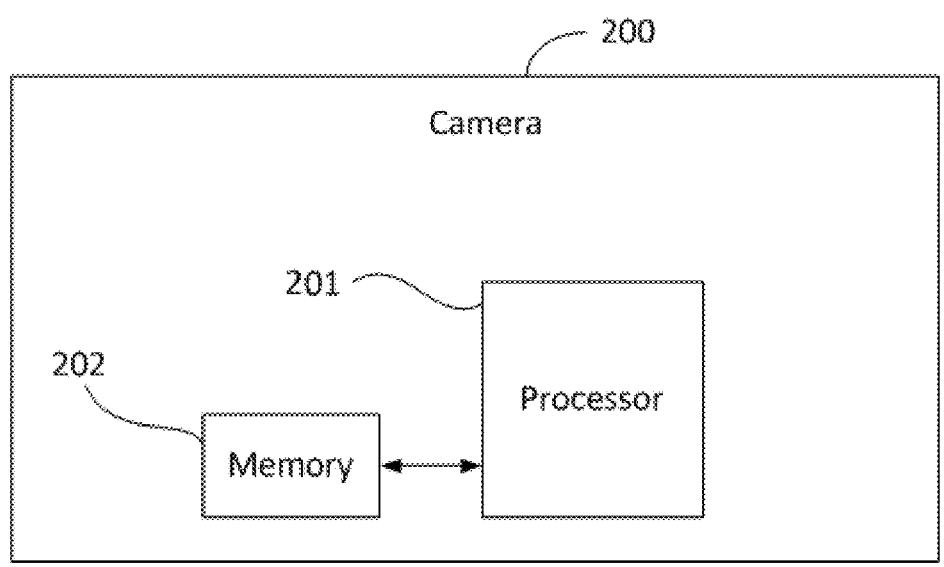
FIG. 12 is a block diagram illustrating the specific structure of a camera provided according to an embodiment of the present application.

FIG. 12 is a block diagram illustrating the specific structure of a camera provided according to an embodiment of the present application, the camera may be the camera shown in FIG. 1, and a camera 200 includes: one or more processors 201, a memory 202, and one or more computer programs, wherein the processor 201 and the memory 202 are connected via a bus, the one or more computer programs are stored in the memory 202 and configured to be executed by the one or more processors 201, and the processor 201 implements the steps of the target tracking method provided according to an embodiment of the present application when it executes the computer program.

It shall be appreciated that, the steps in the embodiments of the present application are not necessarily executed in sequence according to the order indicated by the step numbers. Unless explicitly stated herein, the execution of these steps is not strictly limited in order, and these steps may be performed in other orders. Moreover, at least some of the steps in the embodiments may include multiple sub-steps or multiple stages, these sub-steps or stages are not necessarily executed at the same moment, but may be executed at different moments, and these sub-steps or stages are not necessarily executed in sequence, but may be executed in turn or alternately with at least part of other steps or sub-steps or stages of other steps.

As shall be appreciated by those of ordinary skill in the art, all or some of the processes in the method in the above embodiments may be accomplished by instructing related hardware by a computer program, the program may be stored in a non-volatile computer-readable storage medium, and when executed, the program may include the processes of the embodiments of the methods described above. Any reference to memories, storages, databases, or other media used in the embodiments provided according to the present application may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. By way of illustration but not limitation, RAM may be available in various forms, such as a static RAM (SRAM), a dynamic RAM (DRAM), a synchronous DRAM (SDRAM), a dual data rate SDRAM (DDRSDRAM), an enhanced SDRAM (ESDRAM), a Synchlink DRAM (SLDRAM), a memory bus (Rambus) direct RAM (RDRAM), a direct memory bus dynamic RAM (DRDRAM), and a memory bus dynamic RAM (RDRAM) or the like.

The technical features of the above embodiments may be combined arbitrarily, and for simplicity of description, not all possible combinations of the technical features in the above embodiments are described; however, all these combinations of the technical features shall be considered as within the scope recorded in the present specification as long as there is no contradiction among the combinations of these technical features.

The above embodiments merely present several implementations of the present application, and the description thereof is relatively specific and detailed, but this cannot be thus construed as a limitation on the claims. It shall be noted that, for those of ordinary skill in the art, several variations and improvements can be made without departing from the concept of the present application, and all those variations and improvements are within the scope claimed in the present application. Therefore, the scope claimed in the patent of the present application shall be governed by the appended claims.

The invention claimed is:

1. A target tracking method, comprising:
S101: obtaining a target tracking box tracked in a current video frame and target candidate boxes detected in the current video frame;
S102: matching the target tracking box with the target candidate boxes to determine a best matching target candidate box;
S103: matching one or more remaining target candidate boxes, except for the best matching target candidate box, in the target candidate boxes with a plurality of second target candidate boxes detected in a previously detected video frame to determine a corresponding matching relationship;
S104: according to the best matching target candidate box and the corresponding matching relationship, obtaining distances and overlapping relationships respectively between the best matching target candidate box and the one or more remaining target candidate boxes and between the best matching target candidate box and the second target candidate box, so as to determine a shielding relationship between a target and other objects in the current video frame; and
S105: determining, according to the shielding relationship between the target and the other objects, whether to restart target tracking.

2. The target tracking method according to claim 1, wherein the target candidate boxes detected in the current video frame are specifically:
target candidate boxes detected in the current video frame by performing detection at a predetermined frame interval.

3. The target tracking method according to claim 1, wherein the S102 specifically comprises:
matching the target tracking box respectively with the target candidate boxes by using intersection over union to obtain an IoU value corresponding to each of the target candidate boxes;
taking a target candidate box with the maximum corresponding IoU value and satisfying a preset threshold as the best matching target candidate box.

4. The target tracking method according to claim 1, wherein the S103 specifically comprises:
respectively matching one or more remaining target candidate boxes, except for the best matching target candidate box, in the target candidate boxes with a second target candidate box detected in a previously detected video frame by using intersection over union, and determining corresponding matching relationships between the one or more remaining target candidate boxes and the second target candidate box by using Munkres Assignment Algorithm.

5. The target tracking method according to claim 1, wherein the S103 specifically comprises:
setting an area enlarged at a predetermined proportion as a region of interest by taking the target tracking box as a center, respectively matching one or more remaining target candidate boxes, except for the best matching target candidate box, located in the region of interest among the target candidate boxes with a second target candidate box detected in a previously detected video frame by using intersection over union, and determining corresponding matching relationships between the one or more remaining target candidate boxes and the second target candidate box by using Munkres Assignment Algorithm.

6. The target tracking method according to claim 1, wherein the shielding relationship comprises:
the target is not shielded by the other objects, the other objects gradually move away from the target, the other objects gradually approach the target, and the target is shielded by the other objects.

7. The target tracking method according to claim 6, wherein the S105 specifically comprises:

when the target is not shielded by the other objects or the other objects gradually move away from the target, continuing to track; and when the target is shielded by the other objects, restarting the target tracking to recover tracking of the tracking target.

8. The target tracking method according to claim 6, wherein when the shielding relationship between the target and the other objects in the current video frame is that the other objects gradually approach the target or the target is shielded by the other objects, after the S104, the method further comprises:
determining, according to a confidence of the target tracking, whether the target is shielded by the other objects.

9. The target tracking method according to claim 7, wherein the step of restarting the target tracking to recover tracking of the tracking target is specifically implemented by an ReID network or an image similarity matching algorithm.

10. The target tracking method according to claim 9, wherein the step of restarting the target tracking to recover tracking of the tracking target specifically comprises:
detecting target candidate boxes in a next video frame following the current video frame, wherein the next video frame is a video frame detected next time by a detector;
determining candidate result boxes according to dimension and distance relationships between the target candidate boxes detected in the next video frame and the best matching target candidate box;
inputting the next video frame following the current video frame and the candidate result boxes into the ReID network for forward reasoning to obtain a tracking target again, and when the tracking target is obtained, restarting tracking; otherwise, continuing to execute the step of restarting the target tracking to recover tracking of the tracking target.

11. The target tracking method according to claim 10, wherein the forward reasoning specifically comprises:
inputting the next video frame following the current video frame and the candidate result boxes into the ReID network to obtain a similarity matrix with the best matching target candidate box;
selecting a candidate result box of the minimum similarity distance from the candidate result boxes which are inputted, and determining whether the candidate result box of the minimum similarity distance satisfies a threshold constraint, and when the candidate result box of the minimum similarity distance satisfies the threshold constraint, taking the candidate result box of the minimum similarity distance as a target tracking box to restart tracking.

12. A computer-readable storage medium storing a computer program, wherein the computer program, when executed by a processor, implements a target tracking method;
wherein the target tracking method comprises:
S101: obtaining a target tracking box tracked in a current video frame and target candidate boxes detected in the current video frame;
S102: matching the target tracking box with the target candidate boxes to determine a best matching target candidate box;
S103: matching one or more remaining target candidate boxes, except for the best matching target candidate box, in the target candidate boxes with a plurality of second target candidate boxes detected in a previously detected video frame to determine a corresponding matching relationship;
S104: according to the best matching target candidate box and the corresponding matching relationship, obtaining distances and overlapping relationships respectively between the best matching target candidate box and the one or more remaining target candidate boxes and between the best matching target candidate box and the second target candidate box, so as to determine a shielding relationship between a target and other objects in the current video frame; and
S105: determining, according to the shielding relationship between the target and the other objects, whether to restart target tracking.

13. A computer device, comprising:
one or more processors;
a memory; and
one or more computer programs, the processor and the memory being connected via a bus, the one or more computer programs being stored in the memory and configured to be executed by the one or more processors, the processor implements a target tracking method;
wherein the target tracking method comprises:
S101: obtaining a target tracking box tracked in a current video frame and target candidate boxes detected in the current video frame;
S102: matching the target tracking box with the target candidate boxes to determine a best matching target candidate box;
S103: matching one or more remaining target candidate boxes, except for the best matching target candidate box, in the target candidate boxes with a plurality of second target candidate boxes detected in a previously detected video frame to determine a corresponding matching relationship;
S104: according to the best matching target candidate box and the corresponding matching relationship, obtaining distances and overlapping relationships respectively between the best matching target candidate box and the one or more remaining target candidate boxes and between the best matching target candidate box and the second target candidate box, so as to determine a shielding relationship between a target and other objects in the current video frame; and
S105: determining, according to the shielding relationship between the target and the other objects, whether to restart target tracking.

14. The computer device according to claim 13, wherein the computer device is a camera.

15. The computer device according to claim 13, wherein the target candidate boxes detected in the current video frame are:
a plurality of target candidate boxes detected in the current video frame by performing detection at a predetermined frame interval.

16. The computer device according to claim 13, wherein the S102 comprises:
matching the target tracking box respectively with the target candidate boxes by using intersection over union to obtain an IoU value corresponding to each of the target candidate boxes;
taking a target candidate box with the maximum corresponding IoU value and satisfying a preset threshold as the best matching target candidate box.

17. The computer device according to claim 13, wherein the S103 comprises:
respectively matching one or more remaining target candidate boxes, except for the best matching target candidate box, in the target candidate boxes with a second target candidate box detected in a previously detected video frame by using intersection over union, and determining corresponding matching relationships between the one or more remaining target candidate boxes and the second target candidate box by Munkres Assignment Algorithm.

18. The computer device according to claim 13, wherein the shielding relationship comprises: the target is not shielded by the other objects, the other objects gradually move away from the target, the other objects gradually approach the target, and the target is shielded by the other objects.

19. The computer device according to claim 18, wherein the S105 comprises:
when the target is not shielded by the other objects or the other objects gradually move away from the target, continuing to track; and when the target is shielded by the other objects, restarting the target tracking to recover tracking of the tracking target.

20. The computer device according to claim 18, wherein when the shielding relationship between the target and the other objects in the current video frame is that the other objects gradually approach the target or the target is shielded by the other objects, after the S104, the method further comprises:
determining, according to a confidence of the target tracking, whether the target is shielded by the other objects.

* * * * *